United States Patent

Sanderson et al.

[15] 3,671,601
[45] June 20, 1972

[54] PROCESS FOR THE PURIFICATION OF ALKYLATE

[72] Inventors: Charles L. Sanderson, Glen Burnie; Earl S. Sauer, Baltimore, both of Md.

[73] Assignee: Continental Oil Company, Ponca City, Okla.

[22] Filed: Sept. 3, 1970

[21] Appl. No.: 69,199

[52] U.S. Cl. .................................260/671 B, 260/674 A
[51] Int. Cl. ...........................................................C07c 3/56
[58] Field of Search ..................................260/671 B, 674 A

[56] References Cited

UNITED STATES PATENTS

| | | | |
|---|---|---|---|
| 3,121,123 | 2/1964 | Sharman | 260/671 B |
| 3,355,508 | 11/1967 | Moulden | 260/671 B |
| 3,418,388 | 12/1968 | Hurley et al. | 260/671 B |

Primary Examiner—Curtis R. Davis
Attorney—Joseph C. Kotarski, Henry H. Huth, Robert B. Coleman, Jr., Glen M. Burdick and Carroll Palmer

[57] ABSTRACT

The present invention relates to the purification of crude alkylate produced by the reaction of an olefinic material or a chlorinated paraffinic material with an aromatic compound in the presence of an aluminum halide catalyst. By the present invention, a major portion of the entrained solid impurities resulting from the reaction are separated from the crude alkylate product. The crude alkylate is then contacted with an aqueous treating solution to remove remaining solids and other impurities therefrom and passed to a settling tank. While within the settling tank, the crude alkylate is separated from the treating solution by gravity, and treating solution-alkylate emulsion formed by and containing solids is accumulated at the interface between the layers of separated alkylate and treating solution. The emulsion and solids are withdrawn from the settling tank, passed through a filter whereby the emulsion is broken and the solids removed, with the resultant liquid filtrate being returned to the settling tank. Purified crude alkylate and spent treating solution substantially free from solids are removed from the settling tank.

6 Claims, 2 Drawing Figures

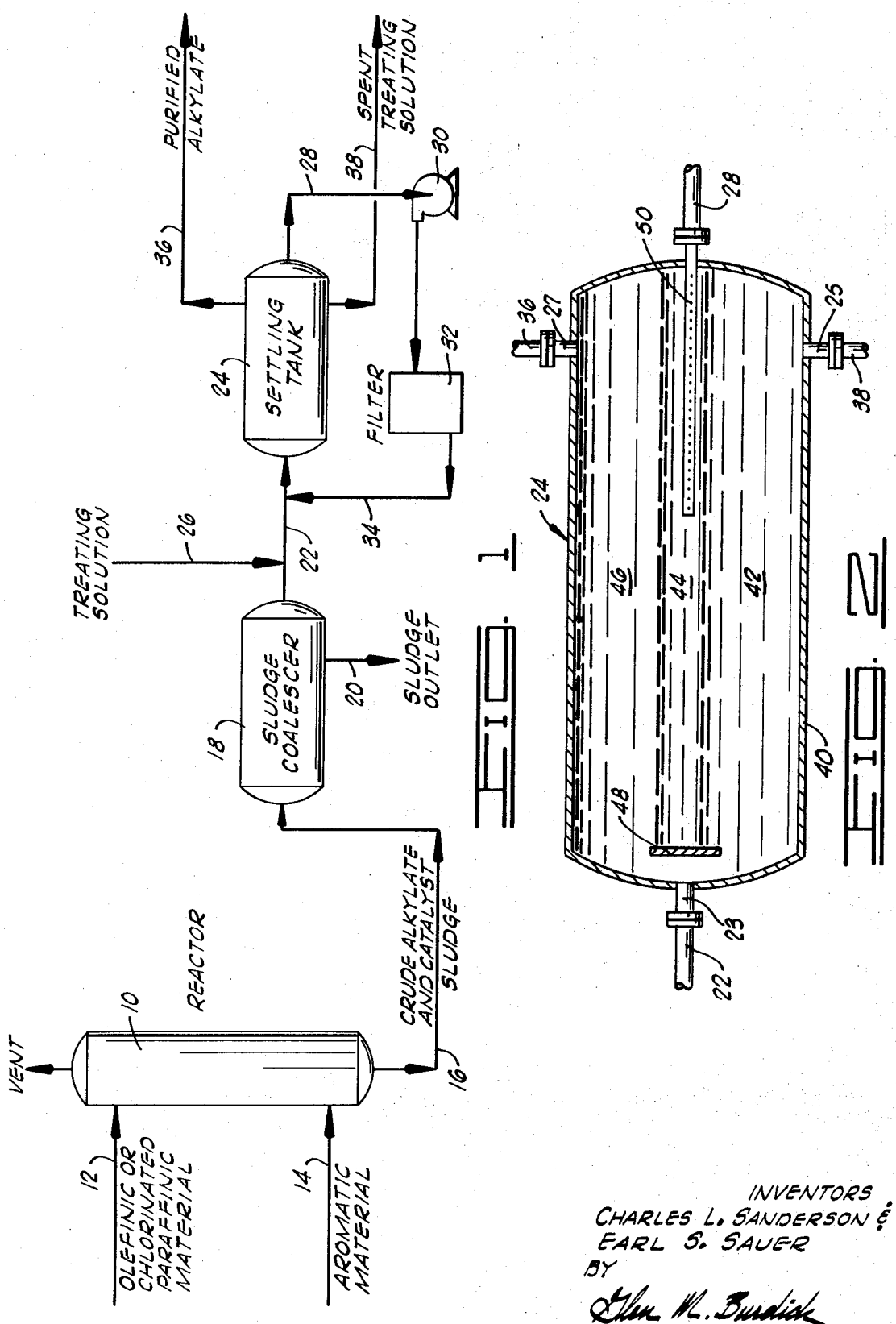

PROCESS FOR THE PURIFICATION OF ALKYLATE

BACKGROUND OF THE INVENTION

1. Field of the Invention

The present invention relates generally to an improved process for the purification of alkylate, and more particularly, but not by way of limitation, to a process for the purification of crude alkylate produced by reacting an olefinic material or chlorinated paraffinic material with an aromatic material in the presence of an aluminum halide catalyst.

2. Description of the Prior Art

In the process currently utilized for purifying the crude alkylate produced by reacting aromatic and olefinic or chlorinated paraffinic materials in the presence of an aluminum chloride catalyst, the crude alkylate effluent from the reactor is introduced to a separator where catalyst sludge is separated from the produced alkylate. The catalyst-free effluent is transferred to a treater where it is washed with an aqueous caustic solution to neutralize and remove acidic impurities. Prior to the caustic wash the crude alkylate may be washed with water. The decanted, purified crude alkylate is then pumped to a fractionation column for separation into its several components.

The above described currently used process is relatively inefficient due to the formation of solids-stabilized emulsions during treating of the crude alkylate with water and/or aqueous caustic solution. A treating solution-alkylate emulsion is formed and stabilized by solid impurities remaining in the crude alkylate. In order to prevent plugging of pipelines and vessels downstream of the crude alkylate purification process and to prevent a reduction in the efficiency of the settling tank, the emulsion formed must be removed. Heretofore, this has been accomplished by periodically dumping emulsion and solids from the settling tank wherein the treating solution and crude alkylate are separated to the drain or sewer. This periodic dumping of emulsion and solids brings about the loss of a portion of the crude alkylate as well as the creation of an industrial waste water pollutant.

By the present invention an improved process for the purification of crude alkylate is provided wherein emulsions produced in water washing and/or caustic treating of the alkylate are eliminated and the solids removed therefrom.

SUMMARY OF THE INVENTION

The present invention relates to a process for the purification of crude alkylate produced by the reaction of an olefinic compound or a chlorinated paraffinic compound with an aromatic compound in the presence of an aluminum halide catalyst. A major portion of the entrained solid impurities are separated from the crude alkylate. The crude alkylate is contacted with an aqueous treating solution to further remove impurities therefrom and then passed to a settling tank wherein the treating solution is separated from the crude alkylate by gravity, and treating solution-alkylate emulsion formed by and containing solids is accumulated at the interface between the separated alkylate and treating solution. The accumulated emulsion and solids are withdrawn from the settling tank and passed through a filter so that the solids are removed and the emulsion broken, with the filtrate being returned to the settling tank. Purified alkylate and substantially solid-free spent treating solution are removed from the settling tank.

It is, therefore, a major object of the present invention to provide an improved process for the purification of crude alkylate.

A further object of the present invention is the provision of a process for the purification of crude alkylate produced by the reaction of an olefinic compound or a chlorinated paraffinic compound with an aromatic compound in the presence of an aluminum chloride catalyst wherein emulsion formed during treatment of the crude alkylate with water and/or caustic solution is continuously broken and solids removed therefrom thereby obviating the need for dumping the emulsion to the drain or sewer.

Yet a further object of the present invention is the provision of an improved process for the purification of crude alkylate wherein problems relating to the formation of solids-stabilized washing solution-alkylate emulsions formed during washing of the crude alkylate are eliminated.

In addition to the foregoing objects and advantages, other objects and advantages will become apparent upon a reading of the following detailed description of the invention taken in conjunction with the accompanying drawings which illustrate the invention.

BRIEF DESCRIPTION OF THE DRAWINGS

FIG. 1 schematically illustrates a typical system which may be employed in practicing the process of the present invention, and FIG. 2 is a sectional view of one form of settling tank which may be employed in accordance with the present invention.

DESCRIPTION OF THE PREFERRED EMBODIMENTS

The present invention is specifically applicable to the treatment of the alkylate product which is produced by condensing long chain or relatively high molecular weight olefinic or chlorinated paraffinic materials with aromatic compounds under the catalytic influence of an aluminum chloride catalyst. The process conditions of alkylation reactions of this type (commonly known as Friedel-Craft reactions) are well known to those skilled in the art. A variety of olefinic and chlorinated paraffinic materials generally between eight and 24 carbon atoms in chain length such as dodecene, eicosene, nonene, monochlorododecane, monochlorodecane, etc., may be condensed with a number of aromatic compounds, such as benzene, toluene, xylene and naphthalene. The process is particularly applicable to the condensations of $C_{10}$–$C_{24}$ olefins with benzene and $C_{10}$–$C_{14}$ monochlorinated normal paraffins with benzene. In olefin condensations, the mole ratio of aromatic to the olefin compound employed is generally from about 2:1 to 10:1, and the weight ratio of catalyst to olefin is usually from about 1:10 to 1:64. The reaction is usually carried out at a temperature of from about 80° F. to about 150° F. at a pressure of from about 5 psig to 35 psig. In the chlorinated paraffin condensations, a mixture of paraffin and chloroparaffin, chlorinated between 10 and 35 mole percent, is reacted with the aromatic compound. The mole ratio of aromatic compound to the chlorinated paraffin (expressing all chlorides as monochlorides) employed is generally from about 0.8:1 to 10:1. The reaction is carried out at a temperature from about 70° F. to about 200° F. at a pressure of about 5 psig to about 35 psig.

The system which is proposed by the present invention for purifying alkylate produced in the manner hereinbefore described is illustrated in FIG. 1. Referring to FIG. 1, reference numeral 10 indicates an alkylation reactor of the conventional type to which the olefinic material or the chlorinated paraffinic material is charged through a conduit 12. The aromatic material which is to be condensed with the olefinic or chlorinated paraffinic material is charged to the reactor 10 through conduit 14. Aluminum chloride is generally employed as the catalyst in alkylation processes of the type described. As is well known and understood in the art, the aluminum chloride catalyst may be utilized in the form of a pure compound, or more frequently, in the form of complexes of aluminum chloride with various organic groups. The catalyst may be introduced to the reactor as a fluidized catalytic system or it may be contained within the reactor in a fixed bed by suspending it upon solid supports such as activated carbon, activated alumina or other material. The catalyst may also be introduced to the aromatic stream prior to the introduction of this stream to the reactor, and in such an eventuality, will take the form of a viscous liquid aluminum chloride complex material or a slurry of solid aluminum chloride catalyst and the reactive hydrocarbon. Commonly, a small amount of a so-called activator, such as hydrogen chloride, is introduced to the reactor to improve the efficiency of the alkylation reaction.

In addition to the alkylate product formed in reactor 10, a substantial amount of viscous, sludge-like catalyst complex is formed which is discharged with the crude alkylate through the reactor discharge conduit 16. The catalyst complex sludge, generally constituting a light brown or orange colored very viscous or gummy material must be removed from the crude alkylate in order to provide an alkylate of acceptable purity. In addition to the catalyst complex sludge, solid aluminum chloride and other impurities are entrained in the crude alkylate as it is discharged from the alkylation reactor 10 through the conduit 16. For example, impurities such as hydrogen chloride, alkyl chlorides and amounts of olefin not consumed in the alkylation process, are generally entrained in the crude alkylate and must be removed in order to provide the quality of alkylate product which is desired.

From the alkylation reactor 10, the crude alkylate with the described impurities entrained therein is passed through the discharge conduit 16 to a sludge separator or coalescer 18. In passing through the coalescer 18, a major portion of the catalyst sludge and most of the solid aluminum chloride is separated from the crude alkylate and removed through the conduit 20. Partially purified crude alkylate passes from the coalescer 18 into the conduit 22.

In order to remove the solids remaining in the crude alkylate as well as neutralize acid impurities such as hydrogen chloride entrained therein, the crude alkylate is washed with water and/or an aqueous caustic solution. The aqueous treating solution passes through conduit 26 which is connected to conduit 22 and mixes with the crude alkylate passing therethrough. The resultant treating solution-crude alkylate mixture then passes into a flooded settling tank 24. In a well understood and conventional manner, the aqueous treating solution separates from the crude alkylate within settling tank 24 by gravity forming a layer of treating solution in the bottom portion thereof with a layer of purified alkylate solution above the treating solution. As previously described solids remaining in the crude alkylate as well as solids which are precipitated in the neutralization reaction cause a treating solution-crude alkylate emulsion to be formed. This solids-stabilized emulsion accumulates in the settling tank 24 at the interface between the body of treating solution in the lower portion thereof and the purified alkylate in the upper portion thereof.

As will be described hereinbelow, the stabilized emulsion accumulating in the settling tank 24 is removed through conduit 28 by a conventional pump 30 and is passed through a conventional filter 32. While passing through the filter 32, solids contained in the emulsion are removed causing the emulsion to be broken. The filtrate, which is a mixture of crude alkylate and treating solution, passes through conduit 34 and is recycled into the settling tank 24. As will be understood, a small quantity of emulsion may be continuously removed from the settling tank 24 by the pump 30, or the pump 30 may be operated periodically to remove emulsion from the settling tank 24 as it accumulates therein. Purified crude alkylate is removed from the settling tank 24 through conduit 36, and spent treating solution is removed from the settling tank 24 through conduit 38.

Referring now to FIG. 2, settling tank 24 is illustrated in cross-section. As will be understood, any of a variety of vessels either horizontal or vertical, may be employed as settling tanks in accordance with the present invention. The only requirement is that the vessel employed must be large enough to provide adequate retention time therein for the gravity separation of the crude alkylate and treating solution to take place. As illustrated in FIG. 2, settling tank 24 preferably comprises a horizontal closed vessel 40 having an inlet connection 23 at the forward end thereof, a treating solution outlet connection 25 at the rearward end thereof and a purified alkylate outlet connection 27 at the rearward end thereof. The inlet connection is connected to the connections 27 and 25 respectively. An inlet deflector baffle 48 is provided adjacent to the inlet connection 23, and an emulsion withdrawal pipe 50, which may be a length of pipe having a plurality of holes therein, is provided at the rearward end of the vessel 40. The emulsion withdrawal pipe 50 is connected to the conduit 28 previously described. In operation of the settling tank 24, the crude alkylate-treating solution mixture enters vessel 40 through the inlet conduit 23. As the mixture passes from the inlet connection towards the rearward end of the vessel 40, gravitational separation takes place. That is, the aqueous treating solution, which is heavier or of a higher specific gravity than the crude alkylate, gravitates towards the bottom of the vessel 40 forming a body 42 thereof. The lighter crude alkylate moves upwardly to the top portion of the vessel 40 forming a body 46 thereof. As previously described, a layer of emulsion 44, stabilized by solids from the crude alkylate, accumulates at the interface between the body 42 of aqueous treating solution and the body 46 of crude alkylate. The inlet baffle 48 prevents the layer of emulsion 44 and the interface between the body of treating solution 42 and body of alkylate 46 from being disturbed by the inlet stream of treating solution and crude alkylate. As will be understood, the top surface of the body 42 of treating solution, or interface between the solution body 42 and emulsion layer 44, is held at a constant level below the emulsion withdrawal pipe 50 by conventional level control (not shown). Thus, as the layer of emulsion 44 accumulates in the settling tank 24, it is removed through the perforated pipe 50. As described above, the withdrawn emulsion is circulated by the pump 30 (FIG. 1) through the conduit 28, and the filter 32 wherein solids contained in the emulsion are removed thereby breaking the emulsion. The resulting filtrate passes through the conduit 34 back to the conduit 22 and into the settling tank 24.

It has been found in pilot plant work that the stabilized emulsion formed when alkylbenzene is washed with a 4 to 6 percent caustic solution may be effectively broken and the solids removed therefrom by a 20 micron cotton filter. However, the particular size and type of filter employed will depend upon the size of the solid particles to be removed from the emulsion during filtration.

After the purified crude alkylate is discharged from the settling tank 24 through the conduit 36, it is charged to a fractionation column where it is fractionated into its several components as desired. The purification procedure herein described is effected to remove substantially all of the emulsion and solid impurities from the crude alkylate so that an acceptable alkylate product is derived from the fractionating process without the necessity of dumping emulsion and solids to the drain or sewer.

The invention having thus been described, no undue limitations or restrictions should be imposed thereon by reason of the inclusion hereinbefore of certain merely explanatory explanations of process conditions and materials employed. It is appreciated that certain modifications and innovations may be made to these process conditions and in the reactions of materials herein described, but insofar as such modifications and innovations do not depart from the basic principles which underlie the invention, such modifications and innovations are deemed to fall within the spirit and scope of the present invention, except as the same may be necessarily limited by the appended claims.

What is claimed is:

1. In the process of producing alkyl substituted aromatic hydrocarbon compounds by reacting olefinic or chlorinated paraffinic hydrocarbon material with an aromatic hydrocarbon material in the presence of an aluminum halide catalyst, the improvement in purifying the crude alkylate produced which comprises:

separating a substantial portion of the entrained solid impurities from said crude alkylate;

contacting the crude alkylate with an aqueous treating solution to neutralize and remove remaining solid and other impurities therefrom;

passing the crude alkylate-treating solution mixture to a settling tank wherein said treating solution is separated from said crude alkylate by gravity and treating solution-alkylate emulsion formed by and containing solids is accumulated at the interface between separated alkylate and separated treating solution;

withdrawing said emulsion and solids from said settling tank;

passing said emulsion and solids through a filter thereby removing said solids and breaking said emulsion;

returning the liquid filtrate obtained from said emulsion to said settling tank;

removing purified alkylate from said settling tank; and removing substantially solid free-spent treating solution from said settling tank.

2. The process of claim 1 wherein said treating solution is water.

3. The process of claim 1 wherein said treating solution is an aqueous caustic solution.

4. The process of claim 1 wherein said filter is of a size such that solids above 20 microns in diameter are removed from said emulsion.

5. In the process of producing alkylbenzene by reacting an olefinic compound or a chlorinated paraffinic compound with benzene in the presence of aluminum chloride catalyst, the improvement in purifying the crude alkylbenzene produced which comprises:

separating a major portion of the entrained solid impurities from said crude alkylbenzene;

contacting the alkylbenzene with an aqueous caustic solution to neutralize and remove remaining solid and other impurities therefrom;

passing the alkylbenzene-caustic solution mixture to a settling tank wherein said caustic solution is separated from said alkylbenzene by gravity and caustic solution-alkylbenzene emulsion formed by and containing solids is accumulated at the interface between separated alkylbenzene and separated spent caustic solution;

withdrawing said emulsion and solids from said settling tank;

passing said emulsion and solids through a filter thereby removing said solids and breaking said emulsion;

returning the liquid filtrate obtained to said settling tank;

removing purified alkylbenzene from said settling tank; and removing substantially solids free-spent caustic solution from said settling tank.

6. The process of claim 5 wherein said filter is of a size such that solids above 20 microns in diameter are removed from said emulsion.

* * * * *